United States Patent

[11] 3,593,203

[72] Inventors Howard Gurnos King;
Graham Joseph Walker, both of London, England
[21] Appl. No. 849,075
[22] Filed Aug. 11, 1969
[45] Patented July 13, 1971
[73] Assignee International Standard Electric Corporation
New York, N.Y.
[32] Priority Oct. 17, 1968
[33] Great Britain
[31] 49298/68

[54] VARIABLE IMPEDANCE PHASE MODULATOR
6 Claims, 3 Drawing Figs.

[52] U.S. Cl. .......... 332/29 R, 307/295, 332/47
[51] Int. Cl. .......... H03c 3/12
[50] Field of Search .......... 332/29, 29 M, 16, 16 T, 47; 307/295

[56] References Cited
UNITED STATES PATENTS

| | | | |
|---|---|---|---|
| 3,191,130 | 6/1965 | Rudd et al. | 332/30 V X |
| 3,214,710 | 10/1965 | Comer | 332/29 |
| 3,250,845 | 5/1966 | Peterson | 332/29 X |
| 3,257,495 | 6/1966 | Williams | 332/29 X |
| 3,482,173 | 12/1969 | Hibert | 307/295 X |

*Primary Examiner*—Alfred L. Brody
*Attorneys*—C. Cornell Remsen, Jr., Walter J. Baum, Paul W. Hemminger, Percy P. Lantzy, Philip M. Bolton, Isidore Togut and Charles I. Johnson, Jr.

ABSTRACT: A wide deviation phase modulator in which a pure resistive variable element is used to phase modulate an RF carrier signal. In one embodiment the variable RF resistor is provided by the primary of a transformer. This resistor is provided by reflecting a resistance value whose value is varied by the modulating signal from the secondary to the primary of the transformer. The reflected resistance is provided by a diode coupled to one end of the secondary which rectifies the RF carrier and generates a unidirectional voltage in an RC circuit. The modulating AF signal is also supplied to the RC circuit. The combination of the unidirectional voltage and AF current produces a load impedance of varying value to the diode. This varying impedance is reflected through the transformer to the primary.

Inventors
HOWARD G. KING
GRAHAM J. WALKER
By Alfred C. Hill
Agent

VARIABLE IMPEDANCE PHASE MODULATOR

BACKGROUND OF THE INVENTION

This invention relates to angular modulators and more particularly to a phase modulator.

SUMMARY OF THE INVENTION

An object of the present invention is to provide a phase modulator capable of wide deviation (±85° ) of a radio frequency (RF) carrier.

A feature of the present invention is to provide a phase modulator comprising first means to provide a carrier signal having a given phase and the carrier signal having a phase 180° different than the given phase; a reactance coupled to the first means responsive to one of the carrier signals having the given phase and the carrier signal having a phase 180° different than the given phase; a variable impedance which is resistive at the frequency of the carrier signal coupled to the first means responsive to the other of the carrier signal having the given phase and the carrier signal having a phase 180° different than the given phase; a source of modulation signal coupled to the variable impedance to vary the resistive value thereof by said modulation signal; and output means coupled in common to the reactance and the variable impedance to obtain as an output signal for the modulator the carrier signal phase modulated by the modulation signal.

BRIEF DESCRIPTION OF THE DRAWING

The above-mentioned and other features and objects of this invention will become more apparent by reference to the following description taken in conjunction with the accompanying drawings, in which.

DESCRIPTION OF THE PREFERRED EMBODIMENTS

Figure 1:
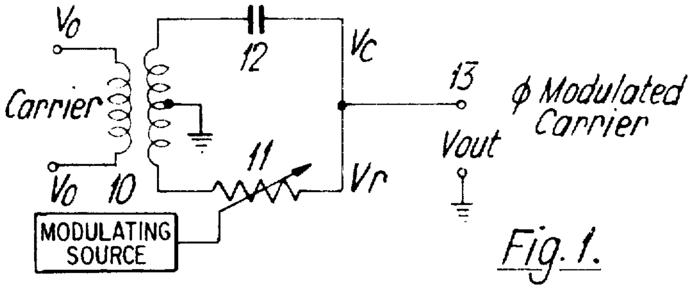
FIG. 1 is a schematic diagram of a phase modulator in accordance with the principles of this invention.

Referring to FIG. 1, there is shown radio frequency transformer 10 with a center tapped secondary. One outer end of the secondary winding is connected to capacitor 12 and the other outer end of the secondary is connected to variable resistor 11. The center tap of the secondary winding is connected to ground and the ends of resistor 11 and capacitor 12 not connected to the transformer secondary winding are connected to terminal 13. The radio frequency carrier to be modulated is supplied to the primary winding of transformer 10. The amplitude of the modulation frequency is arranged to control the value of the variable resistor 11. A phase modulated voltage is obtained between terminal 13 and ground.

Figure 2:
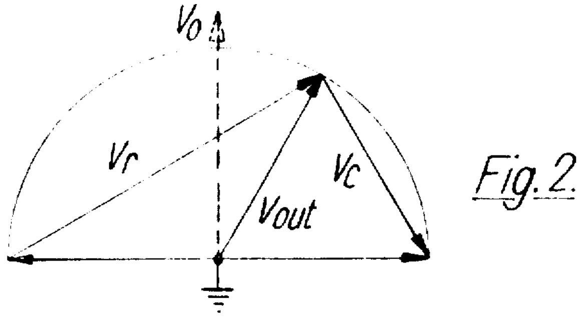
FIG. 2 is a phase diagram.

Phase modulation is produced as follows. There is a phase difference of 180° between the voltages at the outer ends of the secondary winding of transformer 10. The voltage applied to the capacitive path between the transformer and ground, via capacitor 12 and terminal 13, will always be 90° out of phase with respect to the voltage in the resistive path via variable resistor 11. FIG. 2 shows the phase relationships of the voltages in the circuit of FIG. 1. The arrow $V_0$ in FIG. 2 represents the phase of the input carrier wave. The diameter of the circle in FIg. 2 represents the voltage across the secondary winding of transformer 10. $V_r$ and $V_c$ represent the voltages across the resistor and capacitor, respectively. $V_{out}$ is the resultant voltage between terminal 13 and ground. Ground is the center of the circle. $V_r$ and $V_c$ have a 90° phase relationship as mentioned above. The locus of the end of $V_{out}$ must, therefore, lie on the semicircle. As $V_r$ is varied the phase of $V_{out}$ with respect to $V_0$ varies. Thus, when the value of resistor 11 is controlled by a modulation signal the phase of $V_{out}$ is varied in accordance with the magnitude of the modulation signal applied. Thus, the signal at terminal 13 is the carrier wave with its phase varied in accordance with the magnitude of the modulation signal and the repetition rate of change of the phase represents the frequency of the modulation signal.

Figure 3:
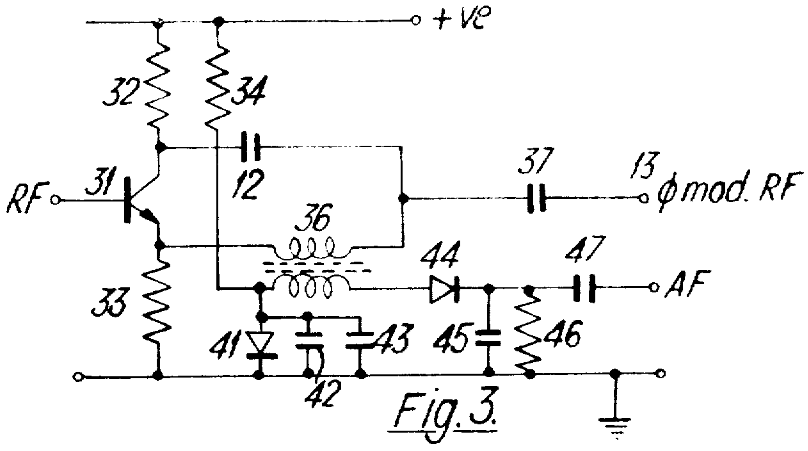
FIG. 3 is a schematic diagram of a transistorized phase modulator in accordance with the principles of this invention.

FIg. 3 shows a circuit embodying the invention and is a phase modulator suitable for modulating a 25 MHz. carrier wave with an audio frequency (AF) modulation signal. This modulator is particularly suitable where carrier frequency power is limited as in mobile transmitters. Transistor 31 acts as the phase splitter and corresponds in function to transformer 10 of FIG. 1. The voltages developed across resistive loads 32 and 33 are in antiphase (180° phase difference). Capacitor 12 corresponds to the similarly numbered component in FIG. 1. Variable resistor 11 of FIG. 1 has been replaced by the primary winding of transformer 36. Capacitor 37 is a DC isolating capacitor for terminal 13. The phase modulator shown in FIG. 1 has a purely resistive variable element to ensure that no amplitude modulation is mixed with the phase modulation. The primary winding of transformer 36 must appear as a pure resistance at the carrier wave frequency to ensure that the modulated carrier at terminal 13 of FIG. 3 is purely phase modulated. This pure RF resistance is achieved by reflecting a resistance, whose value is variable in accordance with the modulation signal, from the secondary winding to the primary winding of transformer 36. Each end of the secondary winding of transformer 36 is connected to a diode. Diode 41 is connects so as to bias the respective ends of the transformer 36. Each end of the secondary winding of transformer 36 is connected to a diode. Diode 41 is connected so as to bias the respective ends of the transformer secondary winding to a positive voltage with respect to ground. This positive voltage is derived through resistor 34 from the positive supply potential and serves to forward bias diode 44. Diode 44 rectifies the radio frequency carrier voltage induced in the secondary winding of transformer 36 and generates a unidirectional voltage in capacitor 45 and resistor 46. The modulation voltage is also supplied to capacitor 45 and resistor 46 through isolating capacitor 47. The combination of the rectified radio frequency current and the audio frequency current in resistor 46 and capacitor 45 produces a load impedance of varying value to diode 44. This varying impedance is reflected through the transformer 36 and appears at the primary winding terminals of this transformer, in the phase splitting network, with a value proportional to the rectifier efficiency and the transformer ratio. Capacitors 42 and 43 provide an audio frequency and a radio frequency path, respectively, to bypass diode 41. The variation in load impedance for rectifier 44 will depend on the magnitude of the audio frequency current and the rate of change of impedance will depend on the frequency of this current. Therefore, a pure RF resistance is created in the phase splitting network with a value dependent on the magnitude and frequency of the modulation signal. The construction of transformer 36 is not critical, but certain types will produce better results than others. The turns-ratio is chosen so that the voltage supplied to rectifier diode 44 is at a level for satisfactory rectification. For example, a wideband type of transformer design in which the capacitive and inductive reactances are equal will produce very satisfactory results. However, a narrow band type of transformer provided with a shunt connected primary winding capacitor and slug tuning to balance the reactive impedances will provide satisfactory results. Diode 44 must be of the fast type to rectify a radio frequency satisfactorily. Diode 41 and it is associated circuit are arranged to provide a suitable bias a low levels of carrier frequency signal. If a large enough carrier signal is available, the bias circuit may be omitted. With a circuit using components of the type described above a phase modulator has been built to operate at frequencies of 25to 31 MHz. carrier frequency in which a deviation of some ±85° has been achieved.

Other types of variable resistance element have been found suitable in the resistive branch of the phase splitting network. For example, a PIN diode can be used. Such a diode, due to the extra hole storage phenomenon, behaves as a pure resistor at radio frequency. By passing audio current and radio frequency current through the diode simultaneously the resistance is varied at audio frequency and this change of resistance varies the phase of the radio frequency current as shown in FIG. 2 above. The PIN diode arrangement uses fewer components than the circuit shown in FIG. 3, but the diode itself is more expensive and is also liable to overload at lower radio frequency signal levels than the circuit shown in FIG. 3. Another alternative is the use of a field-effect transistor as the variable resistance element. This transistor has its bias controlled by the audio frequency signal and again acts in a manner similar to that described above with reference to FIG. 2. It is advantageous to shunt the field-effect transistor with an inductor to offset the stray capacitance.

The various embodiments described above provide wide range phase modulators particularly suitable at frequencies of some 25 to 30 MHz. with deviations approaching the theoretical maximum. Since the modulating element is a pure resistance to radio frequencies, there is no amplitude modulation on the phase modulated signal. The invention is not limited to phase modulators at these frequencies, but is suitable for use over a wide range of carrier and modulation frequencies, taking into account the critical points mentioned, as well as the normal variations in circuit technique necessary for higher and lower carrier frequencies.

While we have described above the principles of may invention in connection with specific apparatus, it is to be clearly understood that this description is made only by way of example.

We claim:

1. A phase modulator comprising:

first means to provide a carrier signal having a given phase and said carrier signal having a phase 180° different than said given phase;

a reactance coupled to said first means responsive to one of said carrier signal having said given phase and said carrier signal having a phase 180° different than said given phase;

a variable impedance which is resistive at the frequency of said carrier signal coupled to said first means responsive to the other of said carrier signal having said given phase and said carrier signal having a phase 180° different than said given phase;

a source of modulation signal coupled to said variable impedance to vary the resistive value thereof by said modulation signal; and output means coupled in common to said reactance and said variable impedance to obtain as an output for said modulator said carrier signal phase modulated by said modulation signal:

said variable impedance including, a first transformer having a first primary winding coupled between said first means and said output means and a first secondary winding, a rectifier coupled to one terminal of said first secondary winding to rectify said carrier signal coupled from said first primary winding to said first secondary winding, and a load impedance coupled to said source of modulation signal, the effective value of said load impedance being varied by said modulation signal, said varying load impedance being reflected from said first secondary winding to said first primary winding to provide said variable impedance.

2. A modulator according to claim 1, wherein said load impedance includes a parallel resistor-capacitor circuit.

3. A modulator according to claim 1, further including a source of voltage coupled to the other terminal of said secondary winding, and a diode coupled to said other terminal of said secondary winding, said source of voltage and said diode cooperating to forward bias said rectifier.

4. A modulator according to claim 3, wherein said load impedance includes a parallel resistor-capacitor circuit; and said first means includes a source of said carrier signal, and a phase splitter.

5. A modulator according to claim 4, wherein said phase splitter includes a second transformer having a second primary winding coupled to said source of said carrier signal and a grounded, center tapped second secondary winding, one terminal of said second secondary winding providing said carrier signal having said given phase and the other terminal of said second secondary winding providing said carrier signal having a phase 180° different than said given phase.

6. A modulator according to claim 4, wherein said phase splitter includes a transistor amplifier including a transistor having its base coupled to said source of said carrier signal, its emitter connected to provide one of said carrier signal having said given phase and said carrier signal having a phase 180° different than said given phase, and its collector connected to provide the other of said carrier signal having said given phase and said carrier signal having a phase 180° different than said given phase.